March 24, 1970 C. F. AULT ET AL 3,503,058

MULTIPLE MEMORY SYNCHRONIZING ARRANGEMENT

Filed March 6, 1967 8 Sheets-Sheet 1

INVENTORS C. F. AULT
D. FRIEDMAN
BY D. F. Sneddker
ATTORNEY

March 24, 1970 C. F. AULT ET AL 3,503,058

MULTIPLE MEMORY SYNCHRONIZING ARRANGEMENT

Filed March 6, 1967 8 Sheets-Sheet 2

March 24, 1970 C. F. AULT ET AL 3,503,058

MULTIPLE MEMORY SYNCHRONIZING ARRANGEMENT

Filed March 6, 1967 8 Sheets-Sheet 3

March 24, 1970 C. F. AULT ET AL 3,503,058

MULTIPLE MEMORY SYNCHRONIZING ARRANGEMENT

Filed March 6, 1967 8 Sheets-Sheet 4

MULTIPLE MEMORY SYNCHRONIZING ARRANGEMENT

March 24, 1970 C. F. AULT ET AL 3,503,058

MULTIPLE MEMORY SYNCHRONIZING ARRANGEMENT

Filed March 6, 1967 8 Sheets-Sheet 7

United States Patent Office 3,503,058
Patented Mar. 24, 1970

3,503,058
MULTIPLE MEMORY SYNCHRONIZING ARRANGEMENT

Cyrus F. Ault, Wheaton, Ill., and David Friedman, Binghamton, N.Y., assignors to Bell Telephone Laboratories, Incorporated, Murray Hill and Berkeley Heights, N.J., a corporation of New York Filed Mar. 6, 1967, Ser. No. 620,715
Int. Cl. G11b 5/00
U.S. Cl. 340—174.1 20 Claims

ABSTRACT OF THE DISCLOSURE

Two independently driven rotating memory units are synchronized by using existing memory timing signals to vary the frequency of each of the two driving sources. The frequency of each driving source is controlled by a signal generated from a digital phase comparison between the two memory units and from an analog frequency comparison with a respective reference oscillator located at each memory unit. The phase comparison sampling rate is varied through several steps according to the magnitude of the phase error between the two memory units.

BACKGROUND OF THE INVENTION

This invention relates to data processing systems employing multiple storage memories and, more particularly, to arrangements for synchronizing the operation of multiple memories in such systems. A general object of the invention is the provision of a simple, compact and economical arrangement for synchronizing the operation of a plurality of dynamic storage memories, such as rotating magnetic drums or disks, continuous tape loops, or the like, with a high degree of accuracy and reliability.

A number of instances arise wherein it is necessary or desirable for two or more storage memories to be employed in synchronism in data processing system. For example, it may be desirable to transfer information back and forth between a plurality of storage memories without intermediate buffer circuitry. Further, it may be necessary to provide an extreme degree of system reliability, such as in the telephone art, by employing two or more storage memories operated in parallel for concurrent handling of the same information. If one of the storage memories becomes disabled, the information is still available in the other storage memory for continued operation of the system.

To avoid any loss in real time when using this parallel or duplex information storage approach, the several storage memories must be synchronized in operation; that is, the respective rotating frequencies must be synchronized in the case of magnetic drums, disks, or the like, as well as the phase of the respective memories. Moreover, the synchronization must be effected with a very high degree of accuracy. For example, with magnetic disk memories currently in use, the required accuracy might be on the order of 1 part in 10,000; that is, within 0.036 degree angular error. Stated another way, if the period of a memory cycle is assumed to be 40 milliseconds, the several memories would be maintained in synchronism to within 4 microseconds agreement in address.

Aside from rigid mechanical coupling between the several storage memories, which is often impractical due to space, location or power limitations, a number of arrangements have been known heretofore for synchronizing the operation of multiple rotating memories in data processing systems. One such known arrangement includes the use of individual synchronous motors driving each storage memory. However, synchronous motors are relatively expensive and, moreover, often do not provide the degree of accuracy required, particularly where the memories are belt-coupled to the drive motors. Similarly, known analog synchronizing arrangements have been found to yield an insufficient degree of accuracy for most data system applications.

Other known synchronizing arrangements employ the use of one or more digital counters and comparators for counting the timing pulse outputs of the respective storage memories, and for determining differences in respective timing pulse counts indicative of differences in the operating frequencies of the several storage memories. Although quite accurate, known digital synchronizing arrangements are expensive and relatively slow in deriving a frequency comparison, thereby limiting the amount of amplification which may be employed in the circuit for frequency correction purposes, and thus limiting the speed with which error corrections may be effected.

SUMMARY OF THE INVENTION

A principal object of this invention, therefore, is to provide an arrangement for rapidly and accurately deriving memory drive control signals proportional to operating frequency and phase differences between two or more storage memories.

A further object of this invention is to provide a simple and economical arrangement for accurately synchronizing the operation of a plurality of storage memories with a minimum of circuitry interconnecting the respective memories.

Another object of this invention is to provide an arrangement for accurately synchronizing a plurality of storage memories with a minimum of cost and circuit complexity and without detracting from the operation or storage capabilities of the several memories.

In an illustrative embodiment of the present invention for synchronizing the operation of a pair of rotating magnetic storage memories, the above and other objects are attained through the use of existing timing signals stored in the respective memories and used for the recording and reading of information relative to the individual memories. According to one aspect of the invention, the existing timing signals stored in the respective memories are utilized further to provide frequency information on a continuous basis and to provide phase information on a periodic basis for memory synchronization purposes. Reference oscillators or like frequency are associated with the respective memories, the respective memory operating frequency being compared with the associated reference oscillator frequency to derive frequency difference control signals. The phase information is exchanged between the several memories, each memory comparing the exchanged phase information with its own phase information to derive phase difference control signals. The latter control signals are combined with the former control signals to control each memory drive independently in a manner providing synchronous operation of the several memories.

Inasmuch as the rotational frequency and phase of each storage memory is synchronized to the rotational frequency and phase of the other memory, rather than one memory being made the master and the other a slave thereto, the magnitude of the error corrections required with respect to each individual storage memory is approximately halved. This permits error corrections to be made more rapidly. Additionally, a reliability feature is provided by the present invention in that if the error control path for one of the storage memories becomes disabled, synchronization of the two memories does not fail. Instead, the memory with the disabled error control path becomes the master and the other storage memory is slaved thereto, rather than each storage memory being synchronized to the other.

The only inter-memory circuit connections required are those for exchanging phase information between the several storage memories. Each storage memory is synchronized in frequency to a nominal frequency provided by a respective associated reference oscillator, thereby eliminating inter-memory differences and minimizing the connections between the storage memories. Thus, according to another aspect of our invention, the frequency comparison is accomplished advantageously via a continuously operating analog arrangement, minimizing cost and circuit complexity, while the phase comparison is accomplished digitally on a periodic basis.

Specifically, for phase synchronization purposes, the address position of each storage memory is periodically compared with the address position of the other storage memories to generate memory drive control signals related to the phase differences. By varying the periodicity of the address comparison, according to a further aspect of our invention, a high degree of accuracy and reliability is achieved with a minimum of circuit complexity and with a minimum of time required for synchronization over a wide pull-in range.

BRIEF DESCRIPTION OF THE DRAWING

The above and other objects and features of the invention may be fully apprehended from the following detailed description and the accompanying drawing in which.

GENERAL DESCRIPTION OF THE INVENTION

Figure 1:
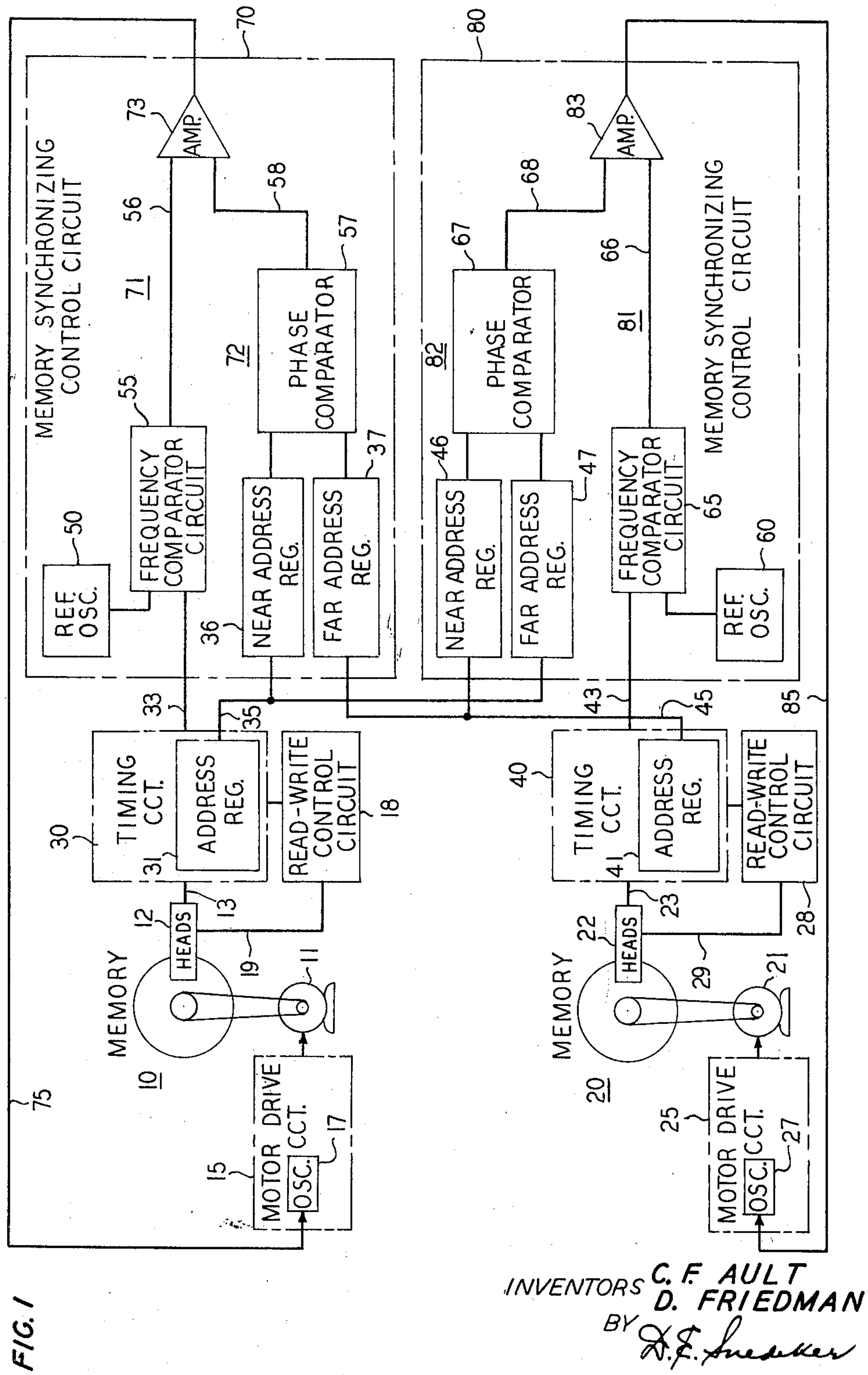
FIG. 1 is a block diagram of an illustrative embodiment of a multiple memory synchronizing arrangement in accordance with the principles of our invention.

In FIG. 1 of the drawing a pair of storage memories 10 and 20, depicted illustratively as magnetic disk storage memories, are driven by respective drive motors 11 and 21 at rotational frequencies determined by motor drive circuits 15 and 25, respectively. Drive motors 11 and 21 advantageously comprise inexpensive induction motors since there is no necessity in accordance with our invention for synchronous drive motors to be employed. Motor drive circuits 15 and 25 comprise circuit arrangements well-known in the art for energizing drive motors 11 and 21. By way of illustration, motor drive circuits 15 and 25 include respective individual oscillators 17 and 27 for determining, along with the characteristics of the motors and the drive couplings to the storage memories, the respective rotational frequencies of storage memories 10 and 20. The frequency of oscillator 17 in motor drive circuit 15 is controllable over a suitable range of frequencies by appropriate control signals on control lead 75, thereby in turn controlling the rotational frequency of storage memory 10. Similarly, the frequency of oscillator 27 in motor drive circuit 25 is controllable by signals on control lead 85 to control in turn the rotational frequency of storage memory 20.

As mentioned above, storage memories 10 and 20 are depicted illustratively in the drawing as magnetic disk memories, each comprising one or more storage disks having two sides upon which information may be recorded magnetically and subsequently readout is effected through the use of one or more transducer assemblies situated adjacent each side of each storage disk, such as transducer heads 12 and 22. However, it will be apparent from the description herein that the principles of the present synchronizing arrangement may be employed to advantage in other known multiple memory or multiple frequency source systems. Moreover, although only two storage memories are shown in the drawing, it will be apparent to those skilled in the art that the principles of our invention may be extended readily to arrangements employing greater pluralities of storage memories.

Recorded on at least one disk of each storage memories 10 and 20 are one or more channels or tracks of timing signals. The timing signals are read out via associated ones of heads 12 and 22, respectively, over signal paths 13 and 23 to timing circuits 30 and 40. Timing circuits 30 and 40 are responsive thereto for timing the recordation, handling and readout of information relative to respective storage memories 10 and 20. In particular, the timing signals are extended by timing circuits 30 and 40 to respective read-write control circuits 18 and 28, which, via paths 19 and 29, respectively, control the selection of individual ones of the heads 12 and 22 for the recordation and readout of information relative to associated individual channels or tracks of storage memories 10 and 20.

Typically, as is well known in the art, the timing signals employed in recording or reading information relative to a rotating magnetic disk or magnetic drum storage memory comprise bit timing signals and addressing signals. The bit timing signals, or clock pulses, are related to the individual bit storage locations in an operating cycle of the storage memory, that is, in a single rotation of a magnetic disk or drum memory. The addressing signals, on the other hand, are related to one or more predetermined storage locations in an operating cycle, such as the initial storage location of each operating cycle or of each of a plurality of subdivisions of an operating cycle. Of course, it is also known in the magnetic disk memory art to divide each disk side or face into a number of concentric, multitrack zones and to provide a distinct zone clock frequency for the recording and readout of information relative to each zone. This type of operation requires an individual clock track or tracks associated with each memory zone.

Figure 9:
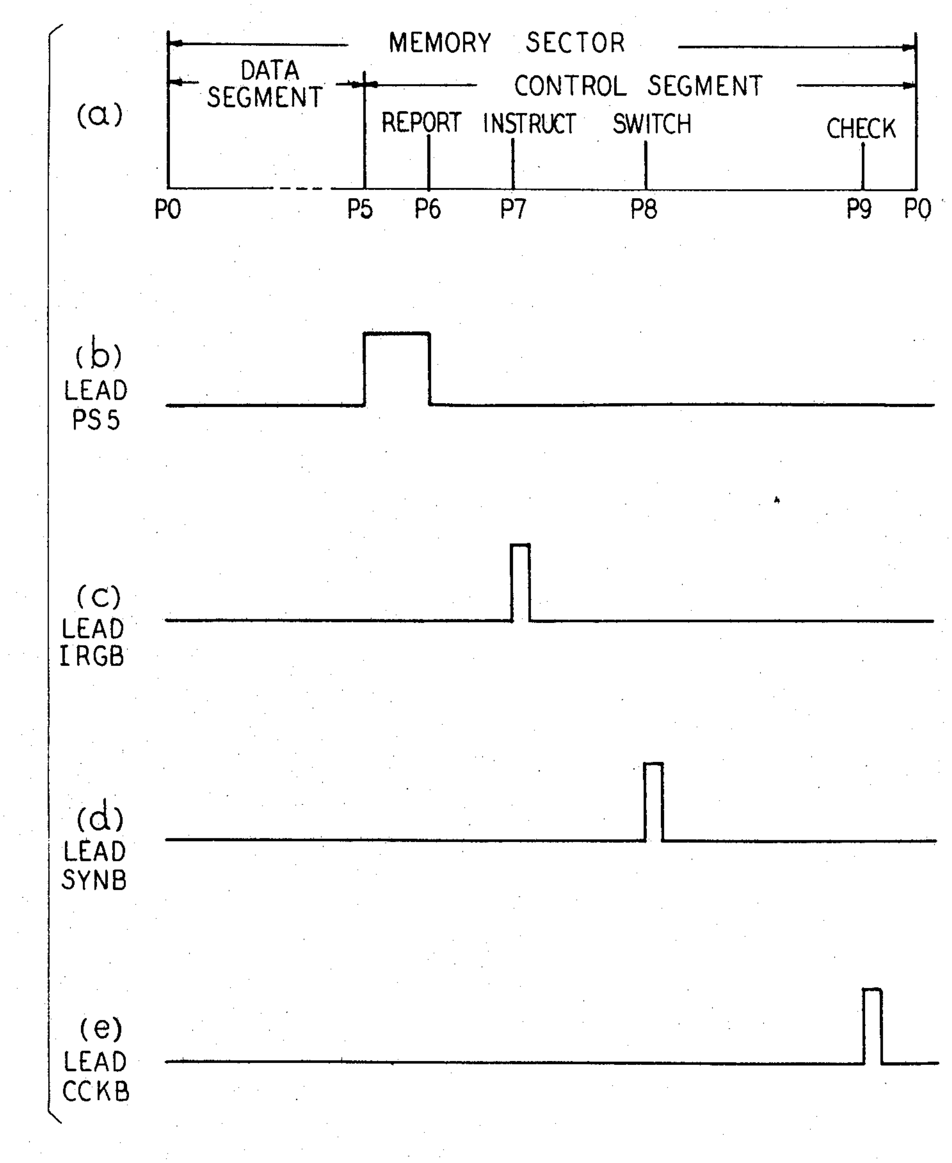

The operating cycle of each of storage memories 10 and 20 in FIG. 1, for example, will be assumed herein to be subdivided into a plurality of multibit storage segments or sectors, e.g., sixteen sectors each identified by a specific sector address. A typical memory storage sector is depicted in FIG. 9(*a*) which will be described in detail below. During operation of storage memory 10 the address of the storage sector currently adjacent heads 12 is registered in address register 31 of timing circuit 30. Similarly, during operation of storage memory 20 the address of the storage sector currently adjacent heads 22 is registered in address register 41 of timing circuit 40. The sector addresses registered in address registers 31 and 41 are continually changing with the rotation of storage memories 10 and 20 to maintain an up-to-date registration of the memory sectors adjacent respective heads 12 and 22.

The timing signals directed to timing circuits 30 and 40 over respective signal paths 13 and 23, in addition to their normal use for recording and reading information relative to the memories, are also employed advantageously in accordance with one aspect of our invention as representations of the operating frequency and phase of respective storage memories 10 and 20 for memory synchronization purposes. Thus, the bit timing signals from memory 10 are extended by timing circuit 30 over signal path 33 to memory synchronizing control circuit 70. Similarly, the bit timing signals of memory 20 are extended by timing circuit 40 over signal path 43 to memory synchronizing control circuit 80.

The sector address registered in address register 31 is extended by timing circuit 30 over path 35 to near address register 36 associated with memory 10, and to far address register 47 associated with memory 20. In the same manner, the sector address registered in address register 41 is extended by timing circuit 40 over path 45 to near address register 46 associated with memory 20 and to far address register 37 associated with memory 10. Thus it will be apparent from the illustrative embodiment of FIG. 1 that the only inter-memory connections required in accordance with our invention are the respective paths for exchanging address position information between the two memories.

Figure 2:
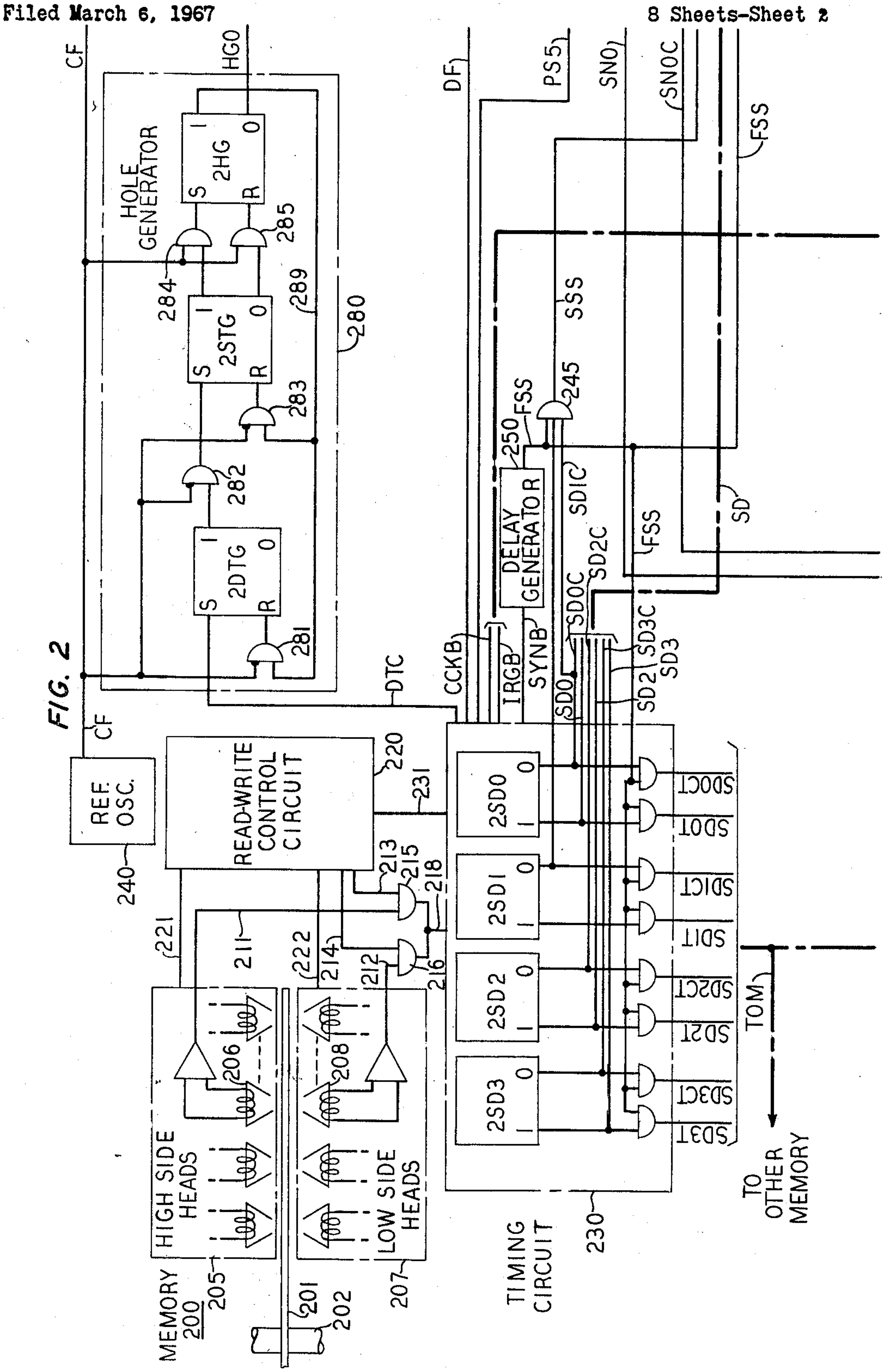
FIGS. 2 through 6, when arranged as indicated in FIG. 7, comprise an additional block diagram showing portions of the embodiment of FIG. 1 in greater detail.
Figure 3:
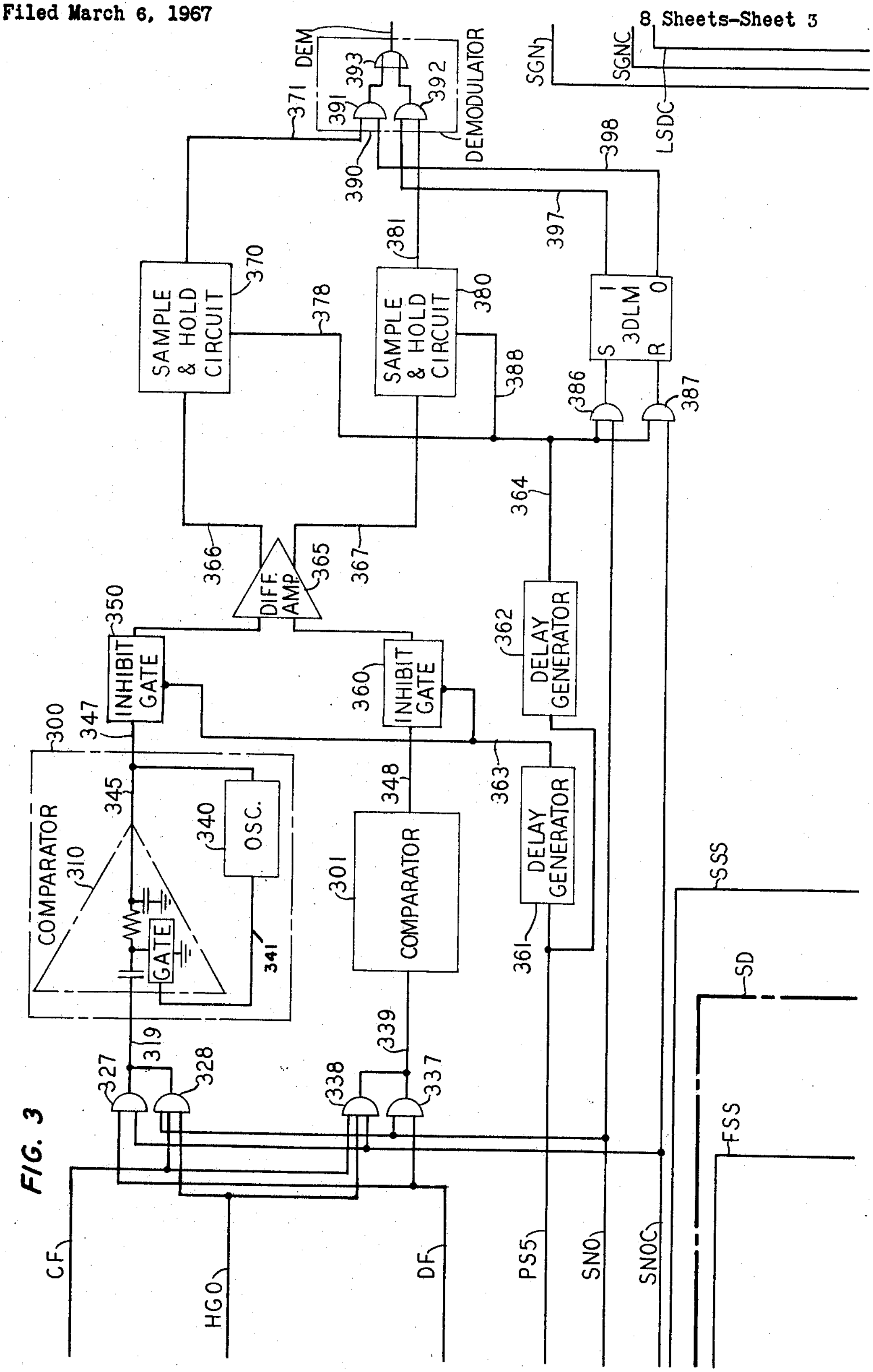

Memory synchronizing control circuits 70 and 80 are substantially identical in structure and in operation. Each comprises a frequency control loop and a phase control loop, such as frequency control loop 71 and phase control loop 72 in memory synchronizing control circuit 70. Frequency control loop 71 includes frequency comparator circuit 55, which may advantageously employ analog circuit techniques as shown in FIGS. 2 and 3, for comparing the frequency of the bit timing signals from memory 10 on path 33 with the frequency of reference oscillator 50 to derive a control signal on lead 56 representative of the frequency difference therebetween.

Frequency control loop 81 in memory synchronizing control circuit 80 includes frequency comparator circuit 65. The frequency of the bit timing signals form memory 20 on path 43 are compared by frequency comparator circuit 65 with the frequency of reference oscillator 60 to derive a control signal on lead 66 representative of the frequency difference therebetween. As will be readily apparent from the description below, if reference oscillators 50 and 60 are of like frequency, the control signals derived on leads 56 and 66 may be employed to control the respective memory drives independently in such manner as to synchronize the individual memory operating frequencies to the frequency of the respective reference oscillators, and thus to each other.

Figure 5:
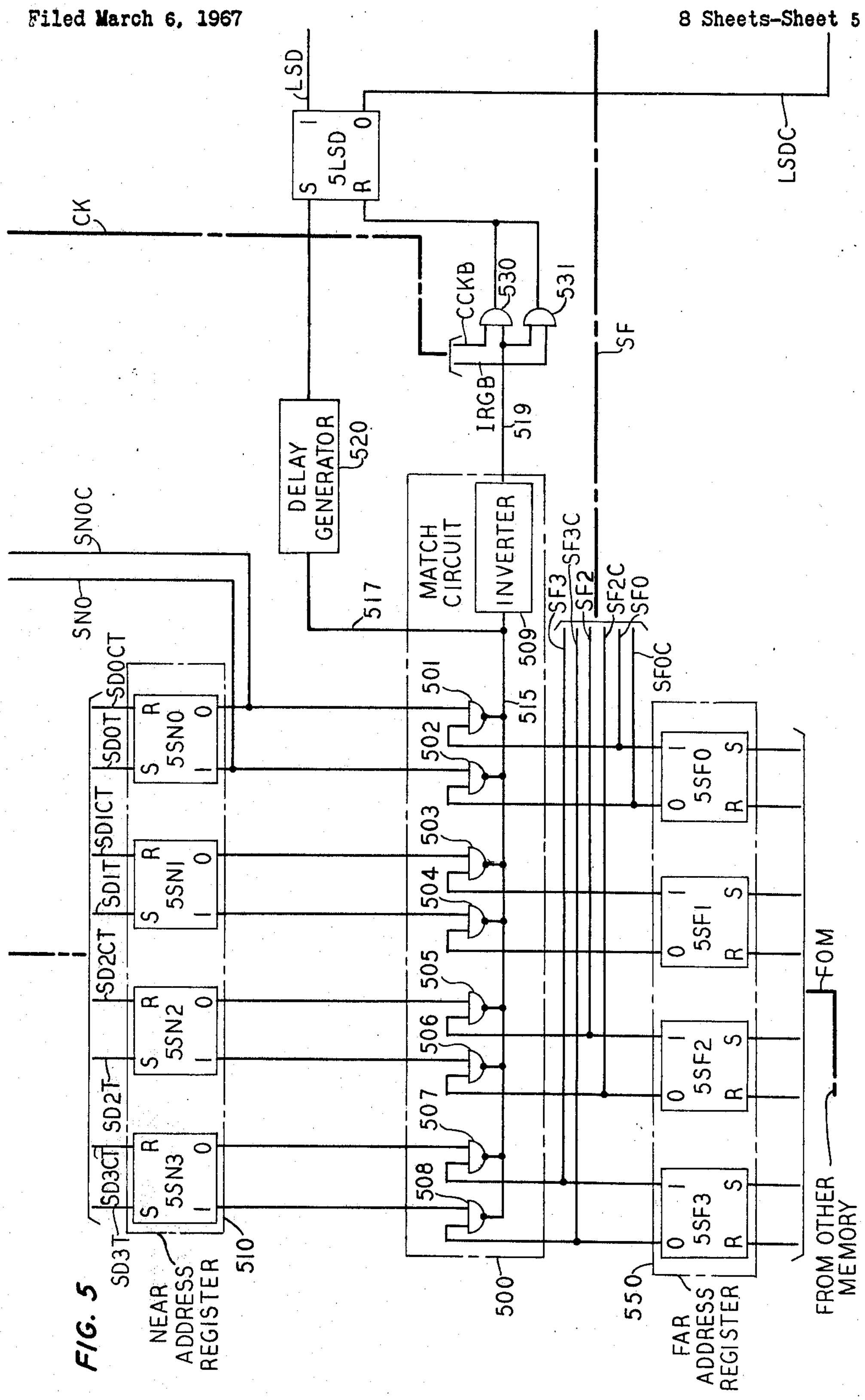
Figure 6:
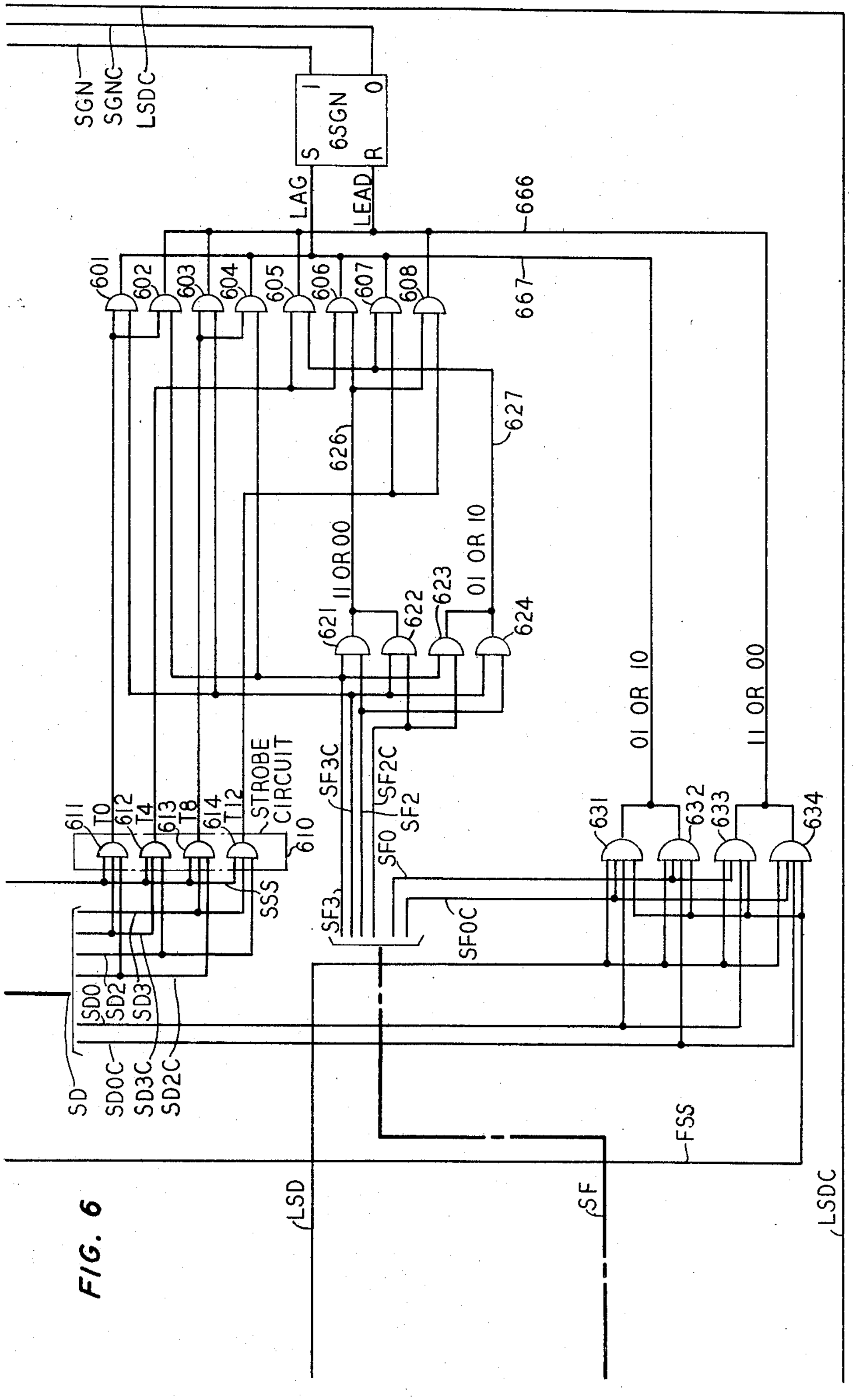

Phase control loop 72 in control circuit 70 includes phase comparator 57 which may advantageously comprise a digital circuit arrangement as shown in FIGS. 5 and 6. The sector address position of memory 10 registered in near address register 36 is compared by phase comparator 57 with the sector address position of memory 20 registered in far address register 37. Responsive thereto, phase comparator 57 derives a control signal on lead 58 representative of the phase difference between memories 10 and 20. The phase difference control signal on lead 58 is combined in amplifier 73 with the frequency difference control signal on lead 56 to provide a motor drive control signal on control lead 75 to motor drive circuit 15. The frequency of oscillator 17 is varied thereby over a suitable range of frequencies to control the rotational frequency of storage memory 10.

A phase difference control signal is similarly derived on lead 68 in memory synchronized control circuit 80 and is combined in amplifier 83 with the frequency difference control signal on lead 66 to provide a motor drive control signal on control ead 85 to motor drive circuit 25. The frequency of oscillator 27 is varied thereby over a suitable range of frequencies to control the rotational frequency of storage memory 20.

Figures 4, 7:
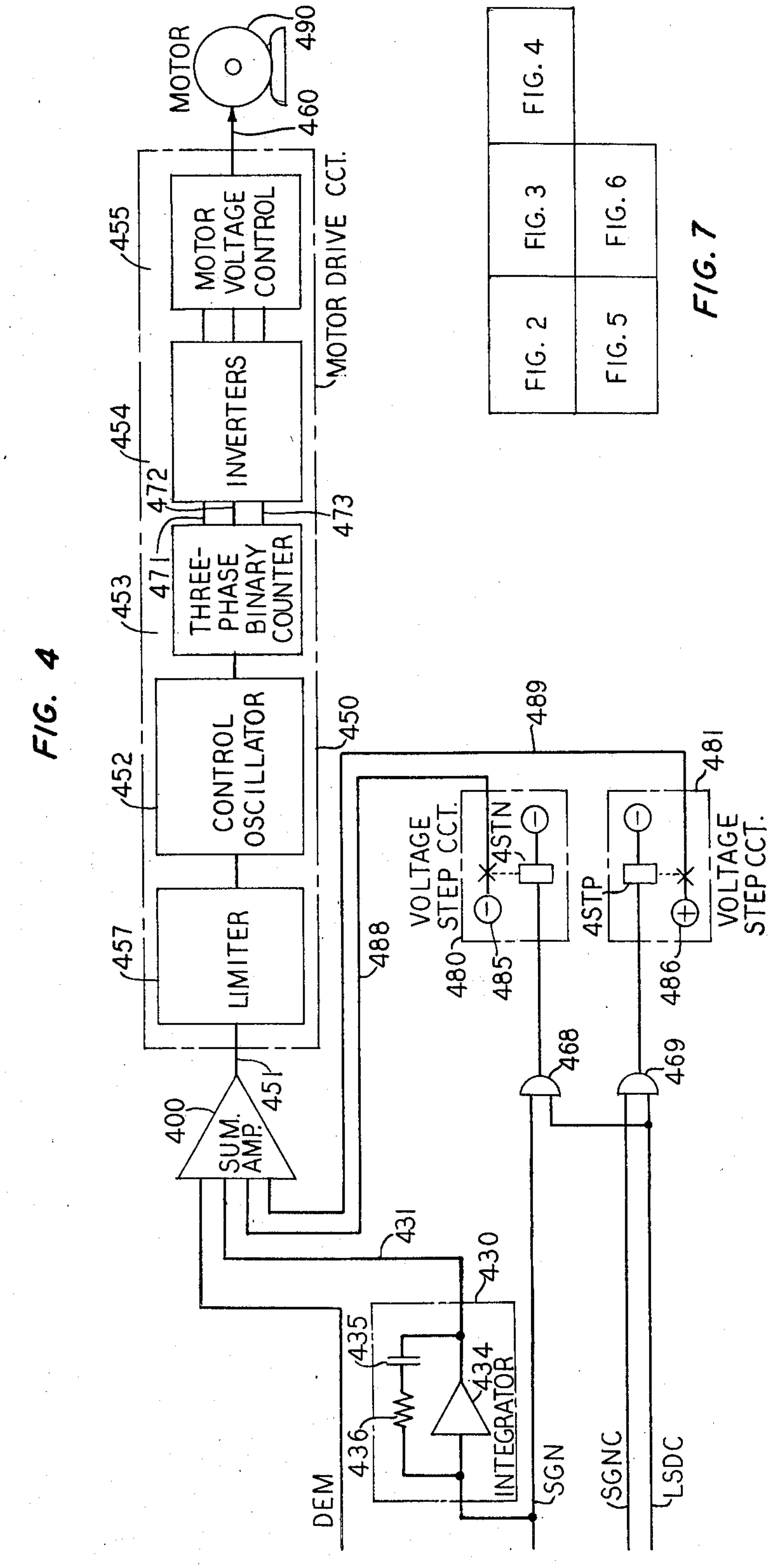

A number of advantages arise from a multiple memory synchronizing arrangement such as shown in FIG. 1. The synchronous operation of two independently driven storage memories is achieved without undue complicating, or adding, to the existing memory circuitry. None of the storage capabilities of the several memories is sacrificed inasmuch as there is no need for special information to be recorded in any of the memories for synchronization purposes. An arrangement permitting the use of analog frequency comparison techniques in conjunction with digital phase comparison techniques minimizes the circuit complexity and cost. The time required for error corrections is reduced since each memory is synchronized to the other; and the attendant redundancy provides a reliability feature in that if one of the paths between the memories is disrupted, memory synchronization does not fail. A more complete and comprehensive description of a specific illustrative embodiment in accordance with the principles of the present invention will be found hereinbelow in the detailed description of the partial schematic diagram shown in FIGS. 2 through 6, when arranged as shown in FIG. 7.

DETAILED DESCRIPTION OF THE INVENTION

In FIGS. 2 through 6, in illustrative embodiment of a memory synchronizing control circuit, corresponding to individual control circuits 70 and 80 in FIG. 1, is shown in greater detail. The frequency control loop is shown generally in FIGS. 2 and 3, and the phase control loop is shown generally in FIGS. 5 and 6. The circuitry for combining the frequency and phase loop control signals is illustratively depicted in block diagram in FIG. 4 along with the motor drive circuit.

Proceeding with the illustrative example described in connection with FIG. 1, the memory synchronizing control circuit of FIGS. 2 through 6 is assumed, for the purposes of describing the invention, to be employed in an arrangement for synchronizing the operation of a pair of magnetic disk storage memories. A portion of one of the storage memories, storage memory 200, is shown in FIG. 2. The portion of storage memory 200 shown comprises one of the plurality of memory storage disks 201 rigidly secured to shaft 202 for rotation. Rotatable shaft 202, and thus the memory 200 storage disks of which disk 201 is a part, are driven by means of a known coupling arrangement (not shown) from drive motor 490 in FIG. 4.

Motor drive circuit

Memory drive motor 490 is energized by motor drive circuit 450 which illustratively comprises a control oscillator 452 for principally determining the rotational frequency of memory 200. Control oscillator 452 has a nominal frequency of, for example, 360 cycles per second which is controllable over a suitable range of frequencies by a control signal on lead 451. The frequency output of oscillator 452 is counted down by three-phase binary counter 453 to form three 60 c.p.s. square waves on respective leads 471, 472 and 473, each 120 degrees apart in phase. Each of the waves on leads 471, 472 and 473 controls, in turn, an individual direct-current to alternating-current inverter in inverters 454.

The inverter outputs are employed by motor voltage control 455 in a well-known manner to energize drive motor 490. Thus motor voltage control 455 may include, by way of example, Y-connected transformers providing a three-phase, 220 volt motor energizing source having a frequency determined by control oscillator 450, and thus by the control signal on lead 451. To protect inverters 454, while permitting the desired range of frequency control of oscillator 452, the magnitude of the control signal on lead 451 may be limited, such as by limiter 457, to a particular range of control signal magnitudes.

Memory timing signals

The timing signals for controlling the recording and readout of information relative to the plurality of storage disks in memory 200 are assumed to be recorded on storage disk 201. Each storage disk of memory 200 has a magnetizable surface on each side thereof which is divided into a plurality of concentric information recording tracks, e.g., 150 information recording tracks on each side of each storage disk. The two sides of the plurality of disks are often referred to as the high side and the low side of the memory.

Also, as mentioned above, it is known to divide the high and low sides of the memory into a number of concentric, multitrack zones and to provide a distinct zone clock frequency for the recording and readout of information relative to the tracks of each zone. For example, the 150 tracks per disk side may be divided into three zones of 50 tracks each. One or more clock tracks are then recorded on each side of disk 201 for each of the three zones. Thus, if information is to be recorded or read out relative to one of the information recording tracks in, for example, the inner zone of the high side of memory 200, timing signals therefor are obtained from the clock track or tracks recorded for the inner zone on the high side of disk 201. Conversely, if information is to be recorded or read out relative to one of the information recording tracks on the low side of memory 200, timing signals therefor are obtained from the clock tracks on the low side of disk 201 for the zone in which the particular information recording track is located.

Each side of each memory storage disk has associated therewith a plurality of transducer heads for recording and readout relative to the various tracks of the disk. The number of transducer heads associated with each disk side may correspond to the number of tracks on the disk side; or the number may be less, the heads being coupled to some arrangement for positioning the heads adjacent selected ones of the tracks. It is assumed herein to facilitate description that each information recording track and each clock track has associated therewith an individual transducer head. This is depicted generally in FIG. 2 by high side heads 205 positioned adjacent the tracks on the high side of disk 201, and by low side heads 207 positioned adjacent the tracks on the low side of disk 201. Individual ones of heads 205 and 207 are selected, in a manner well known in the art, for recording or reading information or timing signals relative to the respectively associated tracks by read-write control circuit 220, via paths 221 and 222. Similar paths extend from read-write control circuit 220 for selecting individual ones of the heads associated with the other disks (not shown) of memory 200.

The timing signals recorded in the clock tracks on disk 201 are also employed advantageously in accordance with our invention as frequency and phase representations for synchronizing the operation of memory 200 with the operation of the other memory (not shown). To ensure stable memory operating frequency and phase representations, the timing signals employed for synchronization purposes are always obtained advantageously from the same memory zone clock tracks, regardless of the zone relative to which the recording or readout of information is occurring.

Assume, for example, that the timing signals for memory synchronization are to be obtained at all times from the middle zone clock tracks. Transducer head 206 is associated with the middle zone timing signals recorded on the high side of disk 201, and transducer head 208 is associated with the middle zone timing signals recorded on the low side of disk 201. The middle zone timing signals read out by heads 206 and 208 on paths 211 and 212, respectively, are directed to respective gates 215 and 216. Read-write control circuit 220, via leads 213 and 214, enables individual ones of gates 215 and 216 to extend the timing signals over path 218 to timing circuit 230. At least one of gates 215 and 216 is enabled at all times during operation of memory 200.

If information recording or readout is being performed relative to the high side of memory 200, the middle zone timing signals recorded on the low side of disk 201 are employed for memory synchronization purposes. Thus, read-write control circuit 220 enables gate 216 to extend the low side middle zone timing signals over path 218 to timing circuit 230. If information recording or readout is being performed relative to the low side of memory 200, read-write control circuit 220 enables gate 215 to extend the high side middle zone timing signals over path 218 to timing circuit 230. Between successive reading and recording operations, i.e., during the control segment of each memory sector, shown in FIG. 8(*a*), read-write control circuit 220 enables both of gates 215 and 216 to extend both the high side and the low side middle zone timing signals over path 218. When the address of the next reading or recording operation is received, control circuit 220 disables the appropriate one of gates 215 and 216, that is, the gate associated with the side of the memory on which the next reading or recording operation is to be performed.

Although only a single transducer head, such as head

206, is shown in FIG. 2 for readout of the timing signals, it will be apparent that the timing signals for each zone will generally be recorded on two or more tracks. Therefore, heads 206 and 208 in FIG. 2 of the drawing will be considered to represent individual transducer heads provided for each such clock track. The timing signals read from the additional clock tracks are gated to timing circuit 230 by read-write control circuit 220 in the manner described above, gates 215 and 216 being representative of the gates associated with the clock heads. For example, as mentioned above in connection with FIG. 1, it is assumed in the illustrative embodiment herein that two clock tracks are employed for each side of each memory zone. In one clock track the bit timing signals are recorded for the memory zone, and in the second clock track the word timing and sector address signals are recorded.

Figure 8:
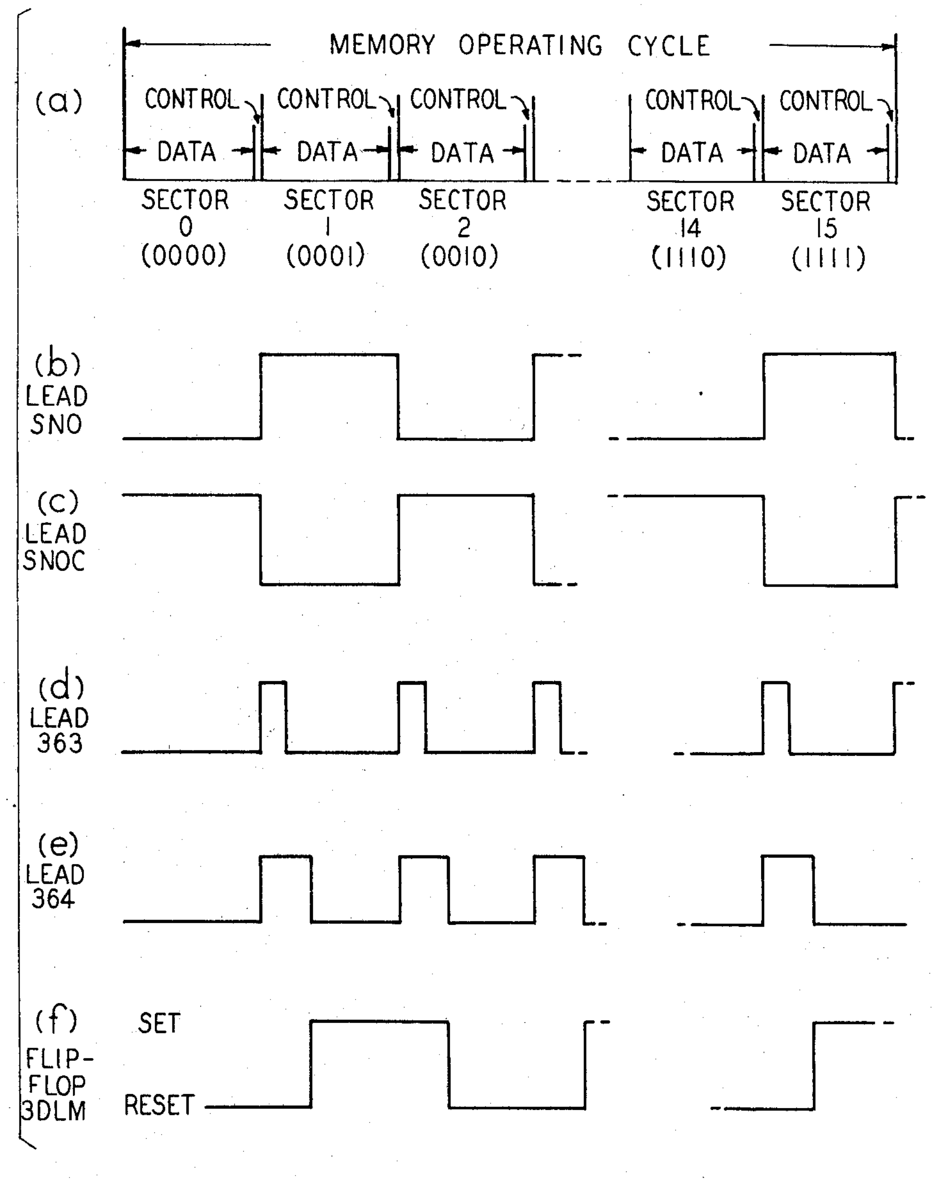
FIGS. 8 and 9 show several timing charts and waveforms useful in describing the operation of the invention.

The sector address signals, it will be recalled, relate to the sixteen sectors into which the memory operating cycle is illustratively divided, as depicted in FIG. 8(*a*). The sixteen memory sectors, sector 0 through sector 15, may be individually identified by a respective four-bit address recorded in the second clock tracks, as indicated in parenthesis below each sector in FIG. 8(*a*). Typically, each memory sector includes a data segment for storage of data and a control segment between data segments. The control segments provide time between successive read and record operations for such control operations as receiving read or record instructions, switching between read and record circuitry, switching between storage tracks, and the like. Appropriate timing signals are generally recorded in the second clock tracks to control the timing of these operations during the control segments of the memory sectors.

An illustrative memory sector is shown in greater detail in FIG. 9(*a*), including the data segment and control segment portions thereof. The data segment of each memory sector may, for example, comprise a varying number of bit storage locations; e.g., between 3000 and 4500, depending upon the memory zone in which the track is located. The control segment of each memory sector, on the other hand, may comprise the same number of bit locations for each track, e.g., 300 bit locations. Within the portions of the second clock tracks corresponding to the control segments of the memory sectors, there are a number of timing marks or signals recorded, such as those depicted in FIG. 9(*a*). For example, timing mark P5 marks the start of a control segment, timing mark P8 marks the time for switching between memory tracks and zones, and timing mark P0 marks the end of the control segment and the beginning of the subsequent data segment.

Responsive to these and other timing marks read out over path 218, timing circuit 430 generates timing signals to control the timing between data segments of operations such as those mentioned above. Thus, responsive to timing work P5, timing circuit 430 generates the timing signal on lead PS5 shown in FIG. 9(*b*); responsive to timing mark P7, the signal on lead IRGB shown in FIG. 9(*c*) is generated; timing mark P8 causes the timing signal on lead SYNB shown in FIG. 9(*d*) to be generated; and the signal on lead CCKB shown in FIG. 9(*e*) is generated in response to timing mark P9. Although these and other timing signals are normally generated by timing circuit 430 for the operation of memory 200, they are also employed in accordance with the present invention in the manner described below for memory synchronization purposes.

Frequency comparator circuit

The frequency comparator circuit shown in FIGS. 2 and 3 corresponds generally to individual frequency comparator circuits 55 and 65 in FIG. 1. The frequency comparator circuit includes compartors 300 and 301 which may comprise known phase-lock oscillator circuitry 310 and a controllable frequency oscillator 340, as shown in comparator 300. Phase lock oscillator circuitry 310 may be of any well-known construction for delivering an output voltage signal on comparator output lead 345 that is representative of the phase discrepancy between a signal on comparator input lead 319 and the output on lead 341 from oscillator 340. The output voltage signal on lead 345 is applied over lead 343 in degenerative feedback fashion, thereby controlling oscillator 340 in such a way as to maintain whatever phase difference is required between the signals on comparator input lead 319 and on lead 341 to cause the output of phase-lock oscillator circuitry 310 to synchronize or lock the frequency of oscillator 340 to the frequency of the signal on comparator input lead 319.

Comparator 300 functions as a frequency detector, input lead 319 thereof being switched by comparator input gates 327 and 328 back and forth between the memory operating frequency representation on lead DF and the frequency representation of reference oscillator 240 on lead CF. Responsive thereto, comparator 300 produces and output square wave on lead 347 having an average voltage level proportional to the frequency difference between the memory frequency on lead DF and the reference frequency on lead CF. Gates 318 and 328 are alternately enabled, at a rate substantially slower than the frequencies of the signals appearing on leads CF and DF, by gating signals derived over leads SN0 and SN0C from near address register 510. The gating signals on leads SN0 and SN0C are generated, in a manner described below and as shown in FIGS. 8(*b*) and (*c*), enabling gate 327 or gate 328 once during each sector of the memory operating cycle.

Comparator 301 is substantially identical in structure and operation to comparator 300, input lead 339 thereof being switched back and forth by input gates 337 and 338 between the memory frequency representation on lead DF and the reference frequency representation on lead CF. Gates 337 and 338 are alternately enabled by the gating signals on leads SN0 and SN0C, respecivtely, such that when the memory frequency representation on lead DF is extended to the input of comparator 300, the reference frequency representaton on lead CF is extended to the input of comparator 301, and vice versa.

The output signal from comparator 300 on lead 347 is directed through inhibit gate 350, difference amplifier 365, sample and hold circuit 370, over lead 371 to demodulator 390. The output signal from comparator 301 or lead 348 is similarly directed through inhibit gate 360, difference amplifier 365, sample and hold circuit 380, over lead 381 to demodulator 390. Demodulator 390 includes gates 391 and 392 for alternately switching leads 371 and 381, respectively, through OR gate 393 to demodulator output lead DEM. Gates 391 and 392 are alternately enabled by gating signals on leads 397 and 398 derived, through demodulator flip-flop 3DLM,, from the above-mentioned gating signals on leads SN0 and SN0C from near address register 510. The resulting output signal on demodulator output lead DEM is a continuous voltage representation of differences between the frequency of reference oscillator 240 and the operating frequency of memory 200.

A more detailed description of the operation of comparators 300 and 301 and of this portion of the frequency comparator circuit shown in FIG. 3 of the drawing may be found in C. F. Ault patent application Ser. No. 446,041, filed Apr. 6, 1965.

In addition to the above-described circuitry, the frequency comparator circuit shown in FIGS. 2 and 3 includes hole generator 280, inhibit gates 350 and 360, and sample and hold circuits 370 and 380. Most storage memories employ series of bit timing signals which are discontinuous in nature; for example, the bit timing signals may be in the form of groups of twelve bit timing pulses with one timing pulse space separating the groups. If the bit timing signals in this form were compared indirectly with the continuous output of reference oscillator 240, which does not normally contain any missing pulses or "holes," an unwanted bias would be introduced into the frequency control loop. To avoid this, hole generator 280 is used to artificially put "holes" in the output of reference oscillator 240; that is, to delete pulses from the reference oscillator output which correspond to the missing pulses in the memory bit timing signals.

Hole generator 280 comprises flip-flops 2DTG, 2STG and 2HG, all of which are normally reset. Operation of hole generator 280 is initiated by a signal on lead DTC from timing circuit 230. The signal on lead DTC, which is generated during normal memory operation by timing circuit 230 when a hole is present in the memory bit timing signals, sets flip-flop 2DTG. The set output of flip-flop 2DTG enables gates 282, setting flip-flop 2STG during the net inter-pulse interval of the output of reference oscillator 240 on lead CF. The set output of flip-flop 2STG, in turn, enables gate 284 to direct the succeeding pulse on lead CF therethrough to set flip-flop 2HG.

Flip-flop 2HG remains set during the appearance of one pulse on lead CF and until the appearance of the next pulse on lead CF, that is, for one cycle of the signal on lead CF. The set state of flip-flop 2HG disables lead HGO to gates 328 and 338, through one or the other of which the output of reference oscillator 240 on lead CF is normally directed to comparator 300 or comparator 301. In this manner, exactly one pulse is deleted from the signal on lead CF, corresponding to the missing pulse in the bit timing signals on lead DF.

The set output of flip-flop 2HG on lead 289 enables gates 281 and 283, causing flip-flops 2DTG and 2STG to be reset during the next inter-pulse interval on lead CF. The succeeding pulse on lead CF then resets flip-flop 2HG through gate 285, which is enabled by the reset output of flip-flop 2STG.

The above-mentioned process of switching the inputs of comparators 300 and 301 between the signal on lead CF and the signal on lead DF may generate spikes of transient voltage at the time of switching. The switching transient spikes are reflected on comparator output leads 347 and 348, and may be many times the magnitude of the normal comparator output signals, sufficient to overload difference amplifier 365. In order to eliminate the effects of the switching transients, the inputs to difference amplifier 365 are blanked or muted via inhibit gates 350 and 360 during the switching of the comparator inputs between leads CF and DF.

Inhibit gates 350 and 360 are actuated to block the signals on comparator output leads 347 and 348, respectively, by a signal on lead 363 from delay generator 361. Delay generator 361 is triggered by a timing signal on lead PS5 from timing circuit 230. The timing signal on lead PS5, shown in FIG. 9(*b*), occurs just prior to the transitions of the signals on leads SN0 and SN0C which effect the comparator input switching, the latter being assumed to occur at timing mark P8 in FIG. 9. The resulting delay generator output signal on lead 363 persists for a predetermined interval of time, such as 0.5 millisecond, blanking the inputs to difference amplifier 365 for this interval of time.

To further eliminate any effects of the switching transients which may still be reflected through difference amplifier 365, and to insure a well-formed square-wave signal representative of the frequency difference detected by comparators 300 and 301, the outputs of amplifier 365 on leads 366 and 367 are processed by sample and hold circuits 370 and 380, respectively. The function of each of sample and hold circuits 370 and 380 is to transmit the signal levels on respective leads 366 and 367 during the time interval free from switching, and to hold the transmitted signal levels during switching and until the frequency comparator circuits have fully recovered from any switching transients.

Sample and hold circuits 370 and 380 may comprise well-known circuitry for performing the above-mentioned function. The hold period of sample and hold circuit 370 is defined by the duration of a suitable signal on lead 378. The same signal on lead 388 defines the hold period for sample and hold circuit 380. The signal on leads 378 and 388 is derived over lead 364 from the output of delay generator 362.

Responsive to the above-mentioned timing signal on lead PS5, delay generator 362 provides a signal over lead 364 to leads 378 and 388, having a predetermined duration such as 1.0 millisecond. Thus, during the blanking of the inputs to difference amplifier 365, and for an interval of time thereafter, e.g., 0.5 millisecond, the outputs of sample and hold circuits 370 and 380 are held level on leads 371 and 381, respectively.

As a consequence of operation of sample and hold circuits 370 and 380, the frequency difference signals appearing on leads 371 and 381 are delayed from the signals on leads 366 and 367, from which they are derived by an amount equal to the predetermined interval of time provided by delay generator 362. In order to properly demodulate the delay signals on leads 371 and 381, an equally delayed replica of the gating signals on leads SN0 and SN0C is required. These delayed demodulator gating signals are derived on leads 397 and 398 by using the output of delay generator 362 to gate the signals on leads SN0 and SN0C through gates 386 and 387 into the respective inputs of demodulator flip-flop 3DLM. Thus, as the output of delay generator 362 on lead 364 goes low, upon termination of the interval of time defined by delay generator 362, gates 386 and 387 are enabled thereby to either set or reset flip-flop 3DLM according to the signals on leads SN0 and SN0C, as depicted in FIG. 8(*f*) of the drawing.

The action of demodulator 390, under control of the output signals from demodulator flip-flop DLDM on leads 397 and 398, is to alternately enable gates 392 and 391, and thus to alternately connect one and then the other of the frequency difference signals on leads 371 and 381 through OR gate 393 to lead DEM. The resultant frequency difference control signal on lead DEM is directed to summing amplifier 400.

Phase control loop

The frequency comparator circuit just described may be thought of as serving as a regulator, maintaining the operating frequency of memory 200 substantially synchronized to the frequency of reference oscillator 240. An identical frequency comparator circuit functions to maintain the operating frequency of the other memory (not shown) substantially synchronized to the frequency of a reference oscillator of the same frequency as reference oscillator 240. The function of the phase control loop, generally shown in FIGS. 5 and 6, may then be thought of as tuning the frequency of memory 200 until it exactly matches the frequency and phase of the other memory.

The phase control loop, it will be recalled from the description of FIG. 1, derives phase difference control signals by comparing the sector address position of the associated memory with the sector address position of the other memory. Assuming the illustrative subdivision of the memory operating cycle into sixteen sectors, the address of each sector is defined by four binary digits recorded in one of the middle zone clock tracks on each side of the memory. During operation of the memory, the sector address of memory 200 is read out over path 218 to timing circuit 230 and is initially registered therein in the four-bit address register comprising flip-flops 2SD0 through 2SD3. As memory 200 rotates, the sector address registered in flip-flops 2SD0 through 2SD3 changes periodically to correspond at all times to the sector position of memory 200. With a memory operating cycle of 40 milliseconds, for example, the sector address in flip-flops 2SD0 through 2SD3 is updated every 2.5 milliseconds. The registration of each new sector address in flip-flops 2SD0 through 2SD3 is assumed herein to occur with timing mark P7 in FIG. 9(*a*).

Subsequently, as initiated by timing mark P8 in FIG. 9(*a*), the sector address of memory 200 is gated out of timing circuit 230 by timing signals generated by delay generator 250 on lead FSS. The sector address is directed in double-rail fashion from timing circuit 230 over leads SD0T and SD0CT through SD3T and SD3CT to near address register 510 associated with memory 200. Therein the four-bit sector address is registered in flip-flops 5SN0 through 5SN3. The sector address of memory 200 on leads SD0T and SD0CT through SD3T and SD3CT is directed concurrently over path T0M for registration in the far address register associated with the other memory (not shown). The four-bit sector address of the other memory is similarly directed from the other memory over path F0M and registered in flip-flops 5SF0 of far address register 550.

Paths T0M and F0M, each comprising four pairs of leads in the illustrative embodiment herein, are the only circuit interconnections between memory 200 and the other memory. It will be appreciated that although paths T0M and F0M each comprise four pairs of leads for parallel transmission of the sector addresses in the illustrative embodiment herein, a single lead could be employed readily for each path and the sector addresses transmitted between memories serially. This would be particularly advantageous where the two memories are separated by a considerable distance.

The least significant digit of the sector address of memory 200 is registered in flip-flop 5SN0 of near address register 510. The binary character of this bit, as represented by the state of flip-flop 5SN0, is reflected over flip-flop output leads SN0 and SN0C, as shown in FIG. 8(*b*) and (*c*), to control the gating operations in the frequency comparator circuit in the manner described above.

A digit-by-digit comparison of the sector address of memory 200 registered in near address register 510 and the sector address of the other memory registered in far address register 550 is provided by match circuit 500. As shown in FIG. 5, match circuit 500 may comprise a number of AND-NOT gates 501 through 508 and inverter 509. The output of gates 501 through 508 on lead 515 is high only when the sector addresses registered in registers 510 and 550 match, and is low for the duration of any mismatch. The high output provides a match signal on lead 517. The low output on lead 515 is inverted by inverter 509 to provide a mismatch signal on lead 519 indicative of the magnitude of the phase error, the duration or width of the signal on lead 519 being representative of the phase error magnitude.

The direction of mismatch, when a mismatch condition prevails, is determined by the circuit arrangement shown in FIG. 6 of the drawing. In particular, the arrangement in FIG. 6 periodically compares the respective address positions of the two storage memories, and sets or resets mismatch sign flip-flop 6SGN via leads 666 and 667, respectively. Mismatch sign flip-flop 6SGN is set by a signal on lead 667 if the address position of memory 200 lags the address position of the other memory, and flip-flop 6SGN is reset by a signal on lead 666 if the address position of memory 200 leads the address position of the other memory. The output of flip-flop 6SGN on lead SGN is integrated by integrator 430 and directed over lead 431 to summing amplifier 400.

To achieve a high degree of accuracy and reliability with a minimum of circuit complexity and with a minimum of time required for synchronization over a wide pull-in range, the periodicity of the sector address comparison may be varied advantageously in accordance with the magnitude of the phase error. In the illustrative embodiments of FIGS. 5 and 6, the periodicity of the sector address comparison is varied over a two-step range. When the phase error is large, such as is generally the case when initially placing the memory systems in operation, the period between address comparisons is greater. As the phase error decreases, the period between position comparison is decreased. Thus, in the illustrative embodiment, when the phase error is greater than a predetermined amount, the period between sector address comparisons is, for example, one quarter memory cycle. As the phase error becomes less than the predetermined amount, the period between address comparisons is decreased, for example, to one-sixteenth memory cycle. With a memory cycle of 40 milliseconds, this provides a phase error sampling rate of once every 10 milliseconds for large phase errors and a rate of once every 2.5 milliseconds for small phase errors.

The phase error sampling rate is determined by phase comparison period flip-flop 5LSD. Flip-flop 5LSD is set when the magnitude of the phase error becomes less than a predetermined time interval, and it is reset when the phase error magnitude exceeds a predetermined time interval. The setting of flip-flop 5LSD is accomplished by the above-mentioned match signal on lead 517, triggering delay generator 520 to set flip-flop 5LSD. For resetting flip-flop 5LSD, two of the time marks normally read from the clock tracks or memory 200 are employed advantageously in the illustrative embodiment to define the predetermined time interval. The timing signals generated from the two timing marks, such as timing marks P7 and P9, are directed by timing circuit 230 over leads CCKB and IRGB to define a window of, for example, 150 microseconds. If a signal occurs on either of leads CCKB and IRGB at a time when gates 530 and 531 are enabled by a mismatch signal on lead 519, flip-flop 5LSD is reset to indicate a large phase error.

With flip-flop 5LSD reset, the sector address comparison is effected four times a memory cycle. This is achieved quite simply by comparing the sector address position of memory 200 with the two most significant digits of the sector address of the other memory. The two most significant digits of the sector address memory 200 are registered initially in flip-flops 2SD3 and 2SD2 of timing circuit 230, and are reflected over leads SD3 and SD3C and leads SD2 and SD2C, respectively, to strobe circuit 610. The two digits of the sector address are combined in strobe circuit 610 to generate four strobe pulses each memory cycle, occurring sequentially on leads T0, T4, T8 and T12 at approximately 10 millisecond intervals, each corresponding to a predetermined sector position of memory 200.

The strobe pulse on lead T0 is generated by the combination in gate 611 of binary zeros for the two most significant digits of the sector address of memory 200. The two most significant digits of the sector address are binary zeros between the start of sector 0 and the end of sector 3. By enabling gate 611 only when the two least significant digits of the sector address are also binary zeros, the strobe pulse is generated on lead T0 at a particular point in time having a fixed relationship corresponding to the start of sector 0 of memory 200.

Accordingly, the binary zero outputs of the two least significant digit address register flip-flops 2SD0 and 2SD1 is reflected over leads SD0C and SD1C to gate 245. Gate 245 is enabled by delay generator 250 at the time of registration of each new sector address in address register flip-flops 2SD0 through 2SD3. The memory 200 sector address registration in flip-flops 2SD0 through 2SD3, rather than near address register 510, is used to avoid race conditions. Upon registration of each new sector address in flip-flops 2SD0 through 2SD3, occurring with timing mark P8 in FIG. 9(*a*), timing circuit 230 generates a timing signal on lead SYNB, triggering delay generator 250. The output of delay generator 250 on lead FSS enables gate 245. The resulting output signal from gate 245 on lead SSS, corresponding to the presence of binary zeros in both of the two least significant digits of the sector address of memory 200, enables gate 611 in strobe circuit 610.

The output signal on lead SSS from gate 245, generated when the two least significant digits of the memory 200 sector address are binary zeros, is also employed to enable gates 612, 613 and 614 in strobe circuit 610. Thus, at the particular point in time when the address position of memory 200 is passing from sector 3 to sector 4 (sector address 0100), a strobe pulse is generated on lead T4 by the combination in gate 612 of a binary zero on lead SD3C for the most significant digit of the sector address and a binary one on lead SD2 for the next most significant digit. Similarly, when the sector address position is passing from sector 7 to sector 8 (sector address 1000), a strobe pulse is generated through gate 613 on lead T8. A strobe pulse is generated through gate 614 on lead T12 when the two most significant sector address digits become binary ones, indicating that memory 200 is passing from sector 11 to sector 12 (sector address 1100).

The strobe pulses generated on leads T0, T4, T8 and T12 thus each correspond to a particular sector address position of memory 200. The two most significant digits of the sector address position of the other memory, as registered in far address register 550, are strobed by one of these pulses approximately every 10 milliseconds. For this purpose, the two most significant digits of the other memory sector address registered in far address register 550 are extended to the circuit arrangement in FIG. 6 over leads SF3 and SF3C and leads SF2 and SF2C, respectively. In order to compare the phase or position of the other memory with memory 200 at the sector address positions defined by the strobe pulses on leads T0 and T8, it is sufficient to observe only the most significant digit of the other memory address appearing on leads SF3 and SF3C. Thus, leads SF3C and SF3 are extended to gates 601 and 602, respectively, strobed by the pulses on lead T0; and leads SF3C and SF3 are also extended to gates 603 and 604, respectively, strobed by the pulses on lead T8.

If the most significant digit of the other memory sector address is a binary zero when a strobe pulse appears on lead T0, this indicates that the sector address position of memory 200 lags the position of the other memory. The resulting output of gate 601 on lead 667 sets flip-flop 6SGN. If, on the other hand, it is a binary one, indicating that memory 200 leads the other memory, the resulting output of gate 602 on lead 666 resets flip-flop 6SGN. A similar operation occurs when a strobe pulse appears on lead T8, setting or resetting flip-flop 6SGN depending upon whether memory 200 lags or leads the position of the other memory.

Both of the most significant digits of the other memory sector address are observed at the sector address positions defined by the strobe pulses on leads T4 and T12. Leads SF3, SF3C, SF2 and SF2C are connected to steering gates 621 through 624 in such manner as to provide an output on lead 626 to gates 606 and 608 if the two most significant digits are identical in binary character (i.e., "11" or "00"). If the two most significant digits of the other memory sector address are dissimilar in character (i.e., "01" or "10"), an output is provided on lead 627 to gates 605 and 607. Accordingly, depending upon which of gates 605 and 606 is enabled by an output from steering gates 621 through 624 when a strobe pulse appears on lead T4, flip-flop 6SGN is reset or set, respectively.

Similarly, the enabled one of gates 607 and 608 provides an output when a strobe pulse appears on lead T12 to either set or reset flip-flop 6SGN. An output from either of gates 605 or 608 on lead 666 indicates a leading condition and resets flip-flop 6SGN; an output from either of 606 or 607 on lead 667 indicates a lagging condition and sets flip-flop 6SGN.

Once the magnitude of the phase error becomes less than the predetermined amount such that flip-flop 5LSD is set in the manner described above, a phase error sampling rate of once each sector, or every 2.5 milliseconds, is provided. This permits the use of the arrangement comprising gates 631 through 634. Since the least significant digit of each memory sector address changes at the start of each sector, it is necessary with a sampling rate of once each sector to compare only this digit of the respective sector addresses. Gates 631 through 634 each have as one input thereto the set output of flip-flop 5LSD, enabling these gates only when the phase error becomes small. A second input to each of gates 631 through 634 is the output on lead FSS from delay generator 250. The output on lead FSS, it will be recalled, is a signal generated, in response to a timing signal from timing circuit 230 on lead SYNB, each time the sector address of memory 200 changes.

The remaining inputs to each of gates 631 through 634 are connected to combinations of lead SF0 and SF0C from far address register 550 and of leads SD0 and SD0C from address register flip-flop 2SD0 in timing circuit 230. Of the four combinations of compared digits, two generate a signal on lead 666 indicating that memory 200 leads the other memory and resetting flip-flop 6SGN accordingly. The remaining two digit combinations generate a signal on lead 667 indicating that memory 200 lags the other memory and setting flip-flop 6SGN. In particular, if the least significant digits of the two memories agree, memory 200 leads and an appropriate output signal is provided by one of gates 633 and 634 on lead 666. If the least significant digits disagree, memory 200 lags and an output signal is provided by one of gates 631 and 632 on lead 667.

As mentioned above, the output of mismatch sign flip-flop 6SGN on lead SGN is integrated by integrator 430 and directed over lead 431 to summing amplifier 400. Integrator 430 may advantageously comprise an operational integrator arrangement, such as shown in FIG. 4, which is responsive to the square-wave input from flip-flop 6SGN to provide an output signal on lead 431 having a step component and a ramp component. Thus integrator 430 comprises amplifier 434 with a negative feedback path through capacitor 435 and resistor 436. When flip-flop 6SGN is set, capacitor 435 charges in one direction; and when flip-flop 6SGN is reset, capacitor 435 charges in the opposite direction. Resistor 436 in series with capacitor 435 produces the step component. The signal on lead 431 from the phase control loop is combined in amplifier 400 with the frequency difference control signal on lead DEM to provide a motor drive control signal on lead 451 to motor drive circuit 450. The frequency of control oscillator 452 is varied over a suitable range of frequencies in accordance with the magnitude of the control signal on lead 451 to control the rotational frequency of storage memory 200.

When the memory system is initially placed in operation the frequency difference between the two memories may be quite large. To correct quickly for such large differences when system operation is initiated and at any subsequent time they occur, voltage step circuits 480 and 481 are provided to apply additional voltage steps to amplifier 400. Under control of the mismatch sign flip-flop 6SGN and the reset, or large phase error, output of flip-flop 5LSD, a positive or a negative step voltage is extended to summing amplifier 400. Thus gates 468 and 469 are enabled by the reset output of flip-flop 5LSD; and depending upon the sign of the difference between the two memories, a signal appears through one or the other of gates 468 and 469 to energize a respective one of voltage circuits 480 and 481. If memory 200 leads the other memory, the reset output of flip-flop 6SGN on lead SGNC is reflected through enabled gate 469 to energize voltage step circuit 481. If memory 200 lags the other memory, the set output of flip-flop 6SGN on lead SGN is reflected through enabled gate 468 to energize voltage step circuit 480.

Voltage step circuits 480 and 481 illustratively include relays 4STN and 4STP, respectively, which are energized by the outputs of respective gates 460 and 461. Energization of relay 4STN in voltage step circuit 480 extends source 485, via a make contact of relay 4STN, over lead 488 to summing amplifier 400. Energization of relay 4STP in voltage step circuit 481 extends source 486, via a make contact of relay 4STP, over lead 489 to amplifier 400. Sources 485 and 486 are of opposite polarity and are each poled in a direction so as to act through amplifier 400 to control the frequency of oscillator 452 in a manner to decrease the differences between the two memories. The step voltage appearing on lead 488 or lead 489 is summed in amplifier 400 with the signals on leads DEM and 431, increasing the speed with which the memories are brought toward synchronization from large errors.

Once the two storage memories have been brought into a small phase error condition, as indicated by the setting of flip-flop 5LSD in the manner described above, gates 468 and 469 are disabled. Consequently, both of relays 4STN and 4STP remain de-energized, removing the connection of both of sources 485 and 486 from the inputs to summing amplifier 400.

To recapitulate briefly, therefore, the frequency of memory 200, as indicated by the bit timing signals therefrom on lead DF, is compared with the frequency of the output from reference oscillator 240 on lead CF. The frequency comparison is effected by gating leads CF and DF back and forth between comparators 300 and 301, such that when the memory frequency representation on lead DF is extended through gate 327 to comparator 300, the reference frequency representation on lead CF is extended through gate 338 to comparator 301, and vice versa. Responsive thereto, comparators 300 and 301 produce complementary output square waves on respective leads 347 and 348 having an average voltage level proportional to the frequency difference between the memory frequency on lead DF and the reference frequency on lead CF. The comparator input gating signals are derived on leads SNO and SNOC from each change in the least significant digit of the sector address of memory 200, thus occurring at a rate substantially slower than the frequency of the signals appearing on leads CF and DF.

If there are any pulses missing in the memory bit timing signals appearing on lead DF, hole generator 280 is responsive thereto, via a signal on lead DTC from timing circuit 230, to delete corresponding pulses from the reference oscillator output on lead CF. Specifically, during the presence of any missing pulses in the signal on lead DF, hole generator 280 blanks the signal on lead CF by disabling lead HG0 and thus comparator input gates 328 and 338.

The effects of any transients generated by gating the comparator inputs back and forth between leads CF and DF are eliminated by blanking the inputs to amplifier 365 during gating, and by sampling and holding the comparator output signal levels during gating and for a predetermined interval of time thereafter. As a result of the operation of sample and hold circuits 370 and 380, the comparator output signals on leads 371 and 381 are delayed by the hold period. This is compensated for at demodulator 390 by using gating signals which are also delayed, through flip-flop 3DLM, by an amount equal to the hold period. Thus, the delayed gating signals derived from leads SN0 and SN0C alternately enable gates 392 and 391, respectively, alternately directing the complementary frequency difference signals on leads 348 and 347 therethrough to provide a continuous indication on lead DEM of the frequency difference between the signals on leads CF and DF.

Concurrently, a phase comparison is made between the two memories by periodically comparing the address position of memory 200, as registered in near address register 510, with the address position of the other memory, as registered in far address register 550. The respective memory address positions are obtained through the normal readout of the sector addresses from the memory clock tracks, and they are exchanged between the memories over paths T0M and F0M during the control segment of each memory sector. The periodicity of the phase comparison is varied through two steps in accordance with the magnitude of the phase error, as indicated by the state of flip-flop 5LSD.

The state of flip-flop 5LSD is determined by match circuit 500. The output of match circuit 500 on lead 517 sets flip-flop 5LSD when the two sector addresses, registered in address registers 510 and 550, agree. When the two sector addresses disagree, the output of match circuit 500 on lead 519 indicates by its duration the magnitude of the period of disagreement. If the period of disagreement, or phase error, exceeds a window defined by timing signals on leads CCKB and IRGB, flip-flop 5LSD is reset.

When flip-flop 5LSD is reset, indicating a large phase error, comparison of the sector addresses is made once every four sectors by comparing the two most significant digits of the four-bit sector addresses. When flip-flop 5LSD is set, indicating a small phase error (less than a sector), comparison of the sector addresses is made once each sector by comparing the least significant digit of the two sector addresses. Utilizing such a two-step phase error sampling rate advantageously simplifies the comparison circuitry required since it is not necessary to provide circuitry for comparison of all four bits of the sector addesses.

Regardless of the phase error sampling rate, the result of the sector address comparison is a signal indicating whether memory 200 lags or leads the other memory, setting or resetting flip-flop 6SGN accordingly. The integrated output of flip-flop 6SGN on lead 431 is summed by amplifier 400 along with the frequency difference signal on lead DEM, and along with the additional step voltage from one of voltage step circuits 480 and 481 in the case of a large phase error. The resulting voltage output on lead 451 inversely varies the frequency of control oscillator 452 in motor drive circuit 450 and, consequently, the rotational frequency of motor 490 and memory 200 coupled thereto.

It is to be understood that the above-described arrangements are but illustrative of the principles of applicant's invention. Numerous other arrangements may be devised by those skilled in the art without departing from the spirit and scope of the invention.

What is claimed is:

1. An arrangement for synchronizing the operation of first and second storage mediums comprising, means for deriving individual output waveforms representative of the respective operating frequencies of said storage medium and for deriving individual manifestations representative of the respective operating phases of said storage mediums, individual reference frequency sources respectively associated with said first and second storage mediums for providing reference waveforms of substantially identical frequency, first frequency comparator means associated with said first storage medium for deriving signals representative of frequency differences between said output waveform and said reference waveform associated with said first storage medium, second frequency comparator means associated with said second storage medium for deriving signals representative of frequency differences between said output waveform and said reference waveform associated with said second storage medium, first phase comparator means associated with said first storage medium responsive to said manifestations from said first and second storage mediums for deriving first signals representative of the phase of said first medium relative to the phase of said second medium, first output means responsive to signals from said first frequency comparator means and to said first signals for controlling the operating frequency of said first storage medium, and second output means responsive to signals from said second frequency comparator means for controlling the operating frequency of said second storage medium.

2. An arrangement in accordance with claim 1 wherein said first and second frequency comparator means each comprise a first and second comparator for generating individual output signals proportional in magnitude to the frequency of input signals applied thereto, gating means for periodically applying said respective output waveform and said respective reference waveform to the inputs of said first and second comparator in an interleaved manner such that when one of said waveforms is applied to said first comparator the other of said waveforms is applied to said second comparator, and means for alternately directing said individual first and second comparator output signals to said respective output means.

3. An arrangement in accordance with claim 2 wherein said first and second frequency comparator means each further comprise means for eliminating the effects on said comparator output signals of any transients generated by the operation of said gating means.

4. An arrangement in accordance with claim 3 wherein said first and second frequency comparator means each further comprise means responsive to the absence of a portion of said respective output waveform for deleting a corresponding portion of said respective reference waveform.

5. An arrangement in accordance with claim 2 wherein said first phase comparator means comprises means responsive to the sign of the relative phase difference between said first and second storage mediums for deriving said first signals.

6. An arrangement in accordance with claim 2 wherein said first phase comparator means comprises means for periodically comparing said manifestations from said first and second storage mediums for deriving a signal representative of the sign of the relative phase difference between said first and second mediums, bistable means responsive to said last-mentioned signal for operating to one or the other of its stable states corresponding to the sign of said signal, and integrator means connected to said bistable means for deriving said first signals.

7. An arrangement in accordance with claim 2 wherein said first phase comparator means comprises means for periodically comparing said manifestations from said first and second storage mediums and for providing a signal whose magnitude is representative of the sign of the phase difference between said medium, and means responsive to the signal from said comparing means for deriving said first signals.

8. An arrangement in accordance with claim 7 wherein said first phase comparator means further comprises means for varying the period between said comparisons in accordance with the magnitude of the phase difference between said mediums.

9. An arrangement in accordance with claim 8 wherein said first phase comparator means further comprises means for determining that the magnitude of the phase difference between said first and second mediums is greater than a predetermined magnitude, and means responsive to said determining means for directing additional control signals to said first output means when said phase difference is greater than said predetermined magnitude.

10. An arrangement in accordance with claim 1 further comprising second phase comparator means responsive to said manifestations from said first and second storage mediums for deriving second signals representative of the phase of said second medium relative to the phase of said first medium, and wherein said second output means is further responsive to said second signals for controlling the operating frequency of said second storage medium.

11. An arrangement in accordance with claim 10 wherein said deriving means comprises means for deriving said individual output waveforms and said individual manifestations from existing timing signals recorded on said first and second storage mediums.

12. An arrangement in accordance with claim 10 wherein said deriving means comprises means for deriving said individual output waveforms from existing bit timing signals recorded on said respective storage mediums and means for deriving said individual manifestations from existing address signals recorded on said respective storage mediums.

13. An arrangement in accordance with claim 12 wherein said first and second phase comparator means each comprise means responsive to said manifestations for periodically comparing the relative address positions of said first and second storage mediums and for providing a signal whose magnitude is representative of the sign of the difference between said address positions, means responsive to the signal from said comparing means in said first and second phase comparator means for deriving said respective first and second signals.

14. An arrangement in accordance with claim 13 wherein said first and second phase comparator means each further comprise means for varying the period between said address position comparisons in accordance with the magnitude of the difference between the address positions of said first and second mediums.

15. An arrangement in accordance with claim 14 wherein said first and second phase comparator means each further comprise means for determining that the magnitude of the difference between the address positions of said first and second mediums is greater than a predetermined magnitude, and means responsive to said determining means for directing additional control signals to said respective output means when said difference is greater than said predetermined magnitude.

16. An arrangement in accordance with claim 10 wherein said first and second phase comparator means each comprise means for periodically comparing said manifestations from said first and second storage mediums for deriving a signal representative of the sign of the relative phase difference between said first and second mediums, bistable means operative to one or the other of its stable states according to the sign of said signal from said comparing means, and integrator means connected to said bistable means for deriving said respective first and second signals.

17. An arrangement in accordance with claim 16 wherein said first and second frequency comparator means each comprise first and second comparator means for generating individual output signals proportional in magnitude to the frequency of input signals applied thereto, gating means for periodically applying said respective output waveform and said respective reference waveform to the inputs of said first and second comparator means in an interleaved manner such that when one of said waveforms is applied to said first comparator means the other of said waveforms is applied to said second comparator means, and means for alternately directing said individual first and second comparator output signals to said respective output means.

18. An arrangement in accordance with claim 17 wherein said first and second frequency comparator means each further comprise means for eliminating the effects on said comparator means output signals of any transients generated by the operation of said gating means.

19. An arrangement in accordance with claim 18 wherein said first and second frequency comparator means each further comprise means responsive to the absence of a portion of said respective output waveform for deleting a corresponding portion of said respective reference waveform.

20. An arrangement in accordance with claim 13 wherein said first and second frequency comparator means each comprise a first and a second comparator for generating individual output signals proportional in magnitude to the frequency of input signals applied thereto, gating means for periodically applying said respective output waveform and said respective reference waveform to the inputs of said first and second comparators in an interleaved manner such that when one of said waveforms is applied to said first comparator the other of said waveforms is applied to said second comparator, and means for alternately directing said individual first and second comparator output signals to said respective output means; and wherein said first and second phase comparator means each further comprise means for determining that the magnitude of the difference between the phase of said first medium and the phase of said second medium is greater than a predetermined magnitude and means responsive to said determining means for directing additional control signals to said respective output means when said phase difference is greater than said predetermined magnitude.

References Cited

UNITED STATES PATENTS 3,195,118 7/1965 St. Clair.

TERRELL W. FEARS, Primary Examiner

U.S. Cl. X.R.

318—18